C. I. JACKSON.
FLEXIBLE AXLE.
APPLICATION FILED AUG. 29, 1917.
1,309,944.
Patented July 15, 1919.
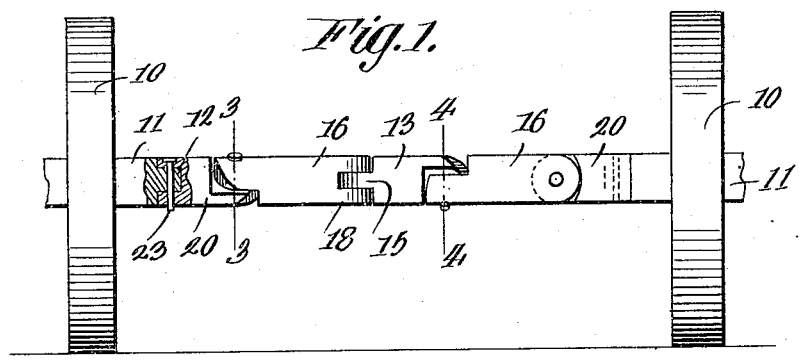
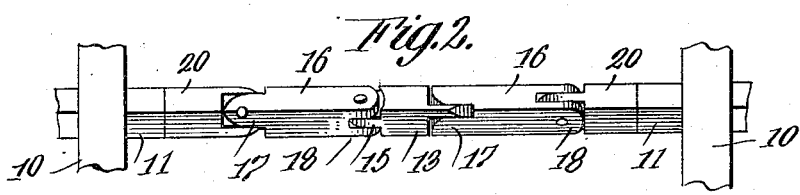
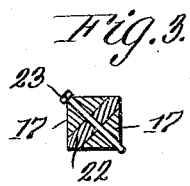
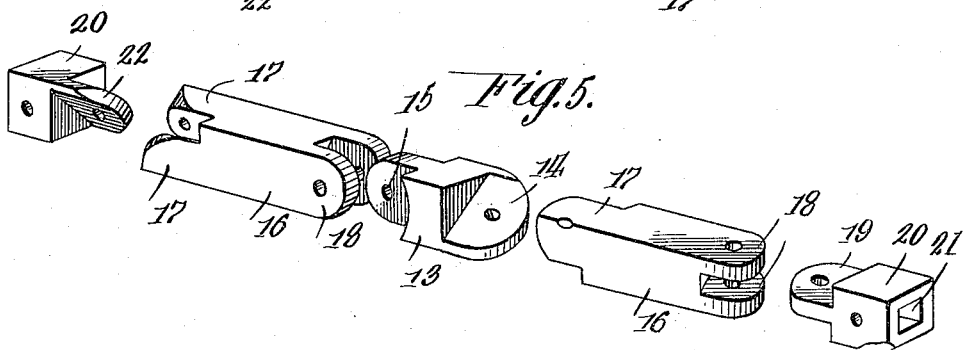
WITNESSES
Guy M. Spring
INVENTOR
Carrie I. Jackson
BY Richard Bowen
ATTORNEY

UNITED STATES PATENT OFFICE.

CARRIE I. JACKSON, OF PEPIN, WISCONSIN.

FLEXIBLE AXLE.

1,309,944.   Specification of Letters Patent.   Patented July 15, 1919.

Application filed August 29, 1917. Serial No. 188,797.

*To all whom it may concern:*

Be it known that I, CARRIE I. JACKSON, a citizen of the United States, residing at Pepin, in the county of Pepin and State of Wisconsin, have invented certain new and useful Improvements in Flexible Axles, of which the following is a specification.

This invention has relation to agricultural machines, and has for an object to provide a flexible axle adapted to be connected to axles of conventional agricultural machines or embodied thereinto to extend the width of the machine.

Another object of the invention is to provide a flexible axle for the purpose above described embodying a plurality of links formed in a novel manner and connected for relative movement.

In addition to the foregoing my invention comprehends improvements in the details of construction and arrangement of the parts to be hereinafter more fully described and particularly set forth in the appended claims.

In the accompanying drawings in which similar and corresponding parts are designated by the same character of reference throughout the several views in which they appear:

Figure 1, is a view of my improved axle in elevation with parts in section.

Fig. 2, is a similar view taken from another angle.

Figs. 3 and 4, are transverse sections taken on the lines 3—3 and 4—4 of Fig. 1, and Fig. 5, is a detail view in section of the parts of the axle in disassociated relation.

An object of my invention is to provide an axle or coupling especially for use in connecting two or more planting machines or the like together, whereby all of the planters may be drawn along together to quickly plant a large area.

With reference to the drawings, 10 indicates a pair of supporting wheels, each wheel being one of a pair for supporting a planter or the like, and 11 indicates the ends of two axles, one for each planter. The end of each axle is reduced and formed with a rectangular extension 12 as indicated. The axle includes a central link 13 which is reduced at one end to provide an ear 14 which extends diagonally across the end of the link, said link being square in cross section as shown. The opposite end of the link is also reduced to form an ear 15 which is however extended perpendicularly across the end of the link or at an angle to the direction of inclination of the ear 14. The ends of the central link 13 are adapted for connection with intermediate links 16, the end of one link being bifurcated by dividing the end of the link diagonally to form a pair of spaced ears 17 to receive the ear 14 of the central link. The links 16 are likewise square in cross section and the opposite end of the link 16 under discussion is bifurcated to form a pair of ears 18 which are formed by dividing the ends of the link perpendicularly to receive the ear 19 of an end link 20. A pair of these end links are provided, one at each end of the intermediate link to receive the reduced squared portion 12 of the stub axles within recesses 21 in the ends of said end links. The other intermediate link 16 is provided with a pair of ears 18 similar to the correspondingly designated ears of the first described intermediate link to receive therebetween the ear 16 of the center link. The opposite end of said second mentioned intermediate link being likewise formed with spaced ears 17 to receive the ear 22 of the opposite end link 20, said ear 22 of said link being extended diagonally across the ends of said link in contradistinction to the manner in which the corresponding ear is formed upon the opposite end link 20. In each case the ears and bifurcated portions are connected by means of pins 23 to permit relative movement in the manner of the links of a chain. It will be noted, however, that the relative movement of these links differ from a chain in that in a chain the relative movement of the links is always in the same plane and in one direction or the other, while in the present instance the planes in which the links are moved relatively are at an angle to one another. Thus, an axle is provided which is flexible and at the same time substantially rigid to permit the transmission of power through the same. The axle is especially applicable in the case of agricultural machines inasmuch as owing to uneven ground the axle may flex to conform to the contour thereof.

While I have illustrated and described my invention with some degree of particularity, I realize that in practice various alterations thereover may be made, and I therefore desire to reserve the right and privilege of changing the form of the details of construction, or otherwise altering the arrangement of the correlative parts without departing from the spirit of the invention or the scope of the appended claims.

Having thus described my invention what I claim as new and desire to secure by Letters Patent is:—

1. The combination with adjacent reduced ends of a pair of axles, of a coupling comprising end links, said end links having a recess in one end to receive the reduced ends of the axles and an ear on the opposite end, means passing through the end links and reduced ends to rigidly connect the end links to the axles, and intermediate links pivotally connected to the ears of the end links and to one another.

2. The combination with adjacent reduced ends of a pair of axles, of a coupling comprising end links, said end links having a recess in one end to receive the reduced ends of the axles and an ear on the opposite end, means passing through the end links and reduced ends to rigidly connect the end links to the axles, a central link having an ear on each end, and intermediate links pivotally connected to said central link and to the end links, said intermediate links having each end bifurcated to receive the ear on the central link and the ear on the end link.

In testimony whereof I affix my signature in presence of two witnesses.

Mrs. CARRIE I. JACKSON.

Witnesses:
LLOYD A. AXTELL,
ANGELINA PETERSON.

Copies of this patent may be obtained for five cents each, by addressing the "Commissioner of Patents, Washington, D. C."